United States Patent Office 3,658,894
Patented Apr. 25, 1972

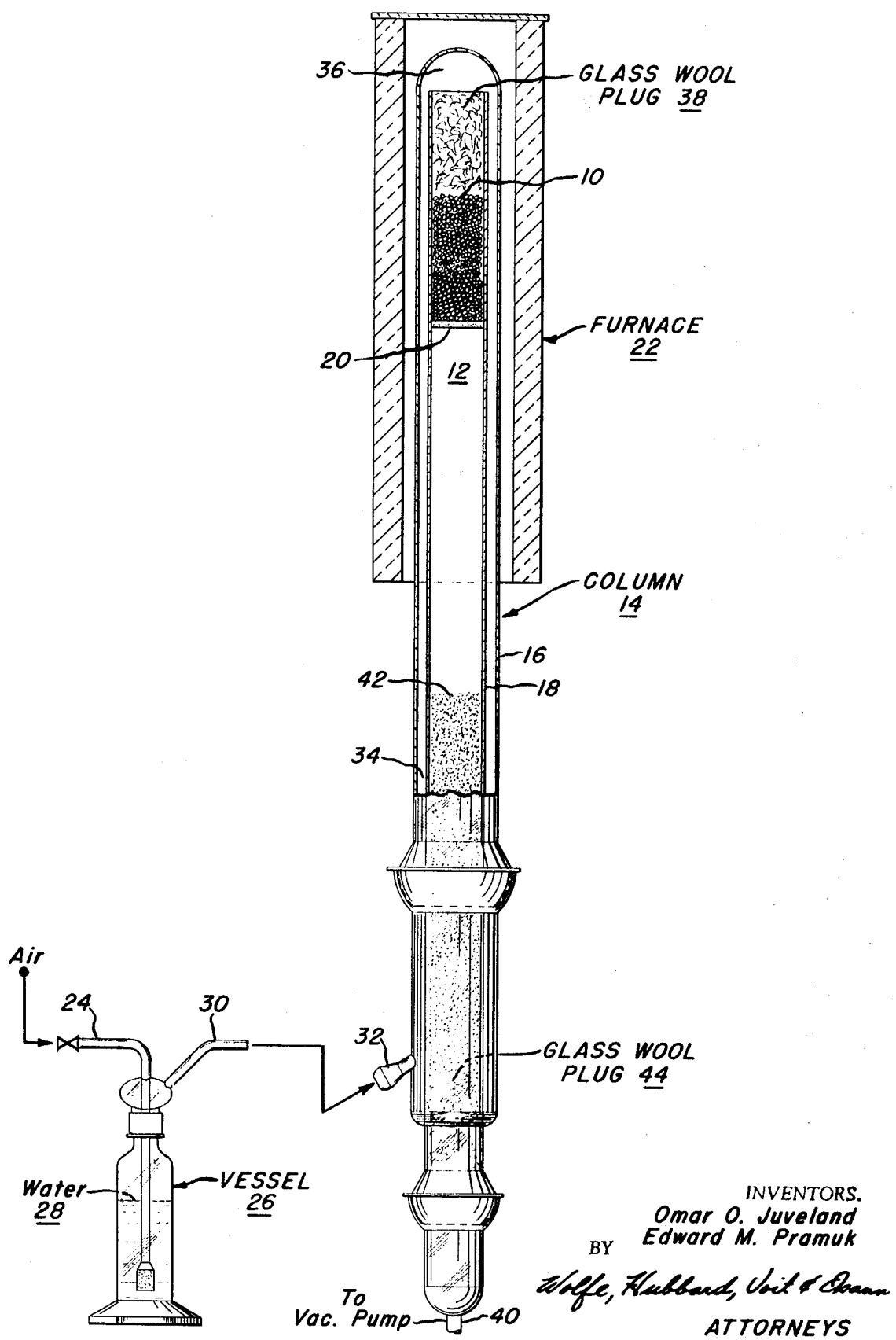

3,658,894
PROCESS FOR PURIFYING TEREPHTHALIC ACID CONTAINING 4-CARBOXYBENZALDEHYDE AS AN IMPURITY
Omar O. Juveland, South Holland, Ill., and Edward M. Pramuk, Whiting, Ind., assignors to Standard Oil Company, Chicago, Ill.
Filed Oct. 2, 1968, Ser. No. 764,557
Int. Cl. C07c 51/42
U.S. Cl. 260—525                                                   9 Claims

ABSTRACT OF THE DISCLOSURE

A process for purifying terephthalic acid by reducing its 4-carboxybenzaldehyde content to below a predetermined level, e.g., 100 p.p.m. or less, to provide a product suitable for use in applications such as forming synthetic fibers comprising raising solid, impure terephthalic acid to a temperature sufficient to cause sublimation, e.g., 235° C. to 285° C. in a reaction zone, passing a gas containing molecular oxygen through the reaction zone to oxidize the 4-carboxybenzaldehyde to terephthalic acid and thereafter recovering the sublimated terephthalic acid. To reduce formation of undesirable side-products from the terephthalic acid, the oxygen-containing gas may contain water vapor.

This invention relates to the purification of terephthalic acid and, more particularly, to a process for substantially reducing the 4-carboxybenzaldehyde content of terephthalic acid.

In almost all of the commercial processes used for manufacturing terephthalic acid, minor amounts of 4-carboxybenzaldehyde are also formed. The presence of this compound in the terephthalic acid, however, makes the product unsuitable for many of its intended applications.

As an example, one significant use of terephthalic acid is in the formation of synthetic fibers. The acid is converted to dimethyl terephthalate which is then reacted to form various other terephthalates. If the 4-carboxybenzaldehyde content of the terephthalic acid exceeds a predetermined amount, i.e.—in most cases about 100 p.p.m., a color problem for any fiber products made from the impure acid will exist.

It is accordingly necessary to, in some manner, reduce the 4-carboxybenzaldehyde content sufficiently so that color problems are obviated.

An object of the present invention is to provide a simple and economical process for purifying terephthalic acid containing a 4-carboxybenzaldehyde impurity.

Other objects and advantages will become apparent as the following description proceeds, taken in conjunction witth the single figure, which schematically illustrates the preferred embodiment of the process of the present invention.

In accordance with the present invention, solid terephthalic acid containing 4-carboxybenzaldehyde as an impurity is purified by a process which comprises raising the terephthalic acid to a temperature sufficient to cause sublimation to the gaseous form in a reaction zone, passing a gas containing molecular oxygen through the reaction zone to oxidize the 4-carboxybenzaldehyde and thereafter recovering the sublimated terephthalic acid. Preferably, the oxygen-containing gas begins to contact the impure terephthalic acid before its temperature has been raised to a level where any significant sublimation takes place. It is accordingly preferred to raise the acid to a temperature of from about 235° C. to about 285° C. with the gas stream being initiated when the temperature has reached at least 200° C. Also, it is preferred to employ a gas which is substantially saturated with water.

Turning now to the single figure, there is schematically illustrated apparatus for carrying out the process of the present invention in a preferred manner. To this end, the solid terephthalic acid containing the 4-carboxybenzaldehyde impurity 10 is placed in the interior 12 of a double-walled container 14 having outer walls 16 and inner walls 18. To prevent the solid terephthalic acid 10 from being displaced downwardly from its position in the column 14, there is provided a fritted glass disc 20. The disc 20 may be held in position by any suitable means which will prevent displacement under the pressure conditions employed. Also, the disc should have sufficient porosity so that gas flow through the disc can take place.

To raise the temperature of the solid terephthalic acid to a level sufficient to cause sublimation to the gaseous form, the portion of the column 14 containing the terephthalic acid 10 is positioned within a furnace 22. The furnace should be capable of raising the terephthalic acid to at least its sublimation point and yet not provide temperatures that will burn or degrade the product being purified. In carrying out these dual objectives, a temperature range of from about 235° C. to about 285° C. has been found to be suitable. A rotary kiln may be used advantageously in place of the illustrated furnace.

Removal of the 4-carboxybenzaldehyde impurity is attained by oxidation to terephthalic acid; and, to serve as the oxidizing gas, any gas may be employed which contains molecular oxygen and is inert with respect to the terephthalic acid. It is preferred to utilize pure oxygen or air, depending upon whether relative efficiency or economy is desired. However, inert gases such as argon and helium diluted with molecular oxygen can also be used. The gas space velocity may be widely varied and a suitable range is from about 0.1 to about 100 cc. oxygen per cc. reactor volume per minute.

As illustrated, air from a source not shown is introduced through line 24 into a vessel 26 containing water 28. The line 24 is submerged in the water 28 to a sufficient depth so that the air exiting the vessel 26 through line 30 is substantially saturated with water vapor. The presence of water mitigates against the possibility that the terephthalic acid will degrade and form such undesirable product as its dianhydride. The thus saturated air enters the column 14 through inlet 32 and moves upwardly through the annulus 34 formed between the outer walls 16 and the inner walls 18. The gas proceeds upwardly through the annulus 34 until it reaches the top portion 36 of the column whereupon it begins proceeding downwardly into the interior 12 and through the terephthalic acid sample 10. To maintain the terephthalic acid sample in position should any bumping occur because of pressure changes, a glass wall plug 38 is positioned in the interior 12 above the terephthalic acid 10.

While the illustrated manner of sweeping the gas upwardly through an annulus and then downwardly through the terephthalic acid is preferred, it would also be possible to directly pass the gas either upwardly or downwardly through the acid. The exemplary gas flow provides excellent control and avoids the possibility that any substantial amounts of 4-carboxybenzaldehyde will prematurely exit the furnace before being oxidized.

To also avoid the possibility that any significant amount of the impurity will prematurely exit, the gas flow is preferbly initiated before temperatures are reached where the impurity or the acid begin to sublime. While gas flow could be initiated immediately upon placing the impure terephthalic acid in the column, it has been found suitable to delay the initiation of gas flow until a temperature of at least about 200° C. has been reached.

When the temperature reaches about 235° C. or higher, the terephthalic acid 10 begins sublimating to the gaseous form and passes through the glass disc 20 with the air. The air space velocity, the portion of the interior 12 which is maintained at temperatures above 235° C. and the pressure under which the system is placed should all be coordinated so that the terephthalic acid does not exit until substantially all of the 4-carboxybenzaldehyde has been oxidized.

Flow through the column 14 may be aided by applying a vacuum to the column outlet 40 by means of a conventional vacuum pump (not shown) or the like. Additionally the pressure that is maintained may vary from about 0.1 mm. mercury to about 15 p.s.i.g. The particular pressure employed depends upon which process parameter is considered important. Utilizing a vacuum allows lower process temperatures and, therefore, cost saving as regards heat exchange. Higher pressures allow increased gas flow.

The thus purified terephthalic acid is recovered near the bottom portion of the interior 12 which is maintained at room temperature. As indicated at 42, the terephthalic acid again sublimes to a solid as its temperature decreases. To retain the purified sublimate 42 in position, a glass wool trap 44 is placed adjacent the bottom of the interior 12.

The following example is merely illustrative of the present invention and not in limitation thereof.

EXAMPLE

Using the apparatus shown in the accompanying drawing, a 20 gram terephthalic acid sample containing 970 parts per million of 4-carboxybenzaldehyde was placed in the interior 12 of the pyrex column 14.

The column had an internal diameter of about 1¼ inch with the outside diameter being about 1½ inches. The furnace had a downward length of 18 inches and there was a distance of 12 inches from the bottom of the furnace to the outlet 40.

Heat was applied to the furnace and the temperature reached 210° C. after about 45 minutes. After maintaining that temperature for about 1¼ hours, the temperature was increased to 250° C. over a period of about 30 minutes. After about one hour, the temperature was then raised to 265° C. and held there for a period of about 2½ hours.

An air flow of 1 to 2 cubic feet per minute was maintained and a vacuum of less than 1 mm. was also maintained. The air flow was begun when the temperature reached 200° C.

At 265° C., all of the sample except for a colored, charred portion was sublimed. With the gradual heat increases, the lower temperature sublimate of 4-carboxybenzaldehyde was allowed to oxidize to terephthalic acid by contact with the moistened air bleed.

The product recovered at the column exit on the glass wool plug weighed 18.6 grams and contained 58 parts per million of 4-carboxybenzaldehyde.

Thus, as has been seen, the present invention provides a novel process for purifying terephthalic acid containing 4-carboxybenzaldehyde as an impurity. This process removes substantially all of this impurity, with its content being reduced to less than about 100 parts per million. At these levels, the 4-carboxybenzaldehyde does not provide color problems that interfere with the use of terephthalic acid in such applications as forming of synthetic fibers. Although the impurity sublimates at lower temperatures than the terephthalic acid it is unnecessary to sequentially raise the temperature to allow for sublimation of the 4-carboxybenzaldehyde before the acid.

While the invention is susceptible to various modifications and alternative forms, specific embodiments thereof have been shown by way of example in the drawing and have been hereinbefore described in detail. It should be understood, however, that it is not intended to limit the invention to the particular forms disclosed, but, the contrary, the intention is to cover all modifications, equivalents and alternatives falling within the spirit and scope of the invention as expressed in the appended claims.

We claim as our invention:

1. A process for purifying solid terephthalic acid containing 4-carboxybenzaldehyde as an impurity by reducing the 4-carboxybenzaldehyde content which comprises raising the terephthalic acid to a temperature sufficient to cause sublimation in a reaction zone, passing a gas containing molecular oxygen through the reaction zone to oxidize the 4-carboxybenzaldehyde and thereafter recovering the sublimated terephthalic acid.

2. The process of claim 1 wherein the oxygen-containing gas is passed through the reaction zone for a period of time sufficient to allow substantially all of the terephthalic acid to sublimate.

3. The process of claim 1 wherein the terephthalic acid is recovered by sublimating the gaseous terephthalic acid to its solid form.

4. The process of claim 1 wherein the gas containing molecular oxygen contains water vapor.

5. The process of claim 1 wherein the terephthalic acid is raised to a temperature in the range of from about 235° C. to about 285° C.

6. The process of claim 1 wherein the pressure is maintained at from about 0.1 millimeter mercury to about 15 pounds per square inch gauge.

7. The process of claim 1 wherein the gas containing molecular oxygen is oxygen.

8. The process of claim 1 wherein the gas containing molecular oxygen is air.

9. The process of claim 5 wherein the passing of the oxygen-containing gas through the reaction zone is initiated after the terephthalic acid temperature has at least exceeded about 200° C.

References Cited
UNITED STATES PATENTS 3,431,296   3/1969   Ichikawa et al. _____ 260—525
3,522,298   7/1970   Bryant et al. _____ 260—525

LORRAINE A. WEINBERGER, Primary Examiner

R. S. WEISSBERG, Assistant Examiner